United States Patent
Kook et al.

(10) Patent No.: US 10,281,012 B2
(45) Date of Patent: May 7, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Jae Chang Kook, Hwaseong-si (KR); Hyun Sik Kwon, Seoul (KR); Ki Tae Kim, Incheon (KR); Wonmin Cho, Hwaseong-si (KR); Seong Wook Hwang, Gunpo-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 35 days.

(21) Appl. No.: 15/788,301

(22) Filed: Oct. 19, 2017

(65) Prior Publication Data

US 2018/0306279 A1    Oct. 25, 2018

(30) Foreign Application Priority Data

Apr. 24, 2017    (KR) .................. 10-2017-0052118

(51) Int. Cl.
*F16H 3/66*    (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01); *F16H 2200/2097* (2013.01)

(58) Field of Classification Search
None
See application file for complete search history.

(56) References Cited

U.S. PATENT DOCUMENTS

| | | | | |
|---|---|---|---|---|
| 8,047,950 B2 * | 11/2011 | Wittkopp | .................. | F16H 3/66 475/276 |
| 8,047,954 B2 * | 11/2011 | Phillips | ..................... | F16H 3/66 475/282 |
| 9,587,716 B1 * | 3/2017 | Park | .......................... | F16H 3/66 |
| 9,644,712 B2 * | 5/2017 | Kook | ........................ | F16H 3/66 |
| 9,797,480 B2 * | 10/2017 | Ji | ............................... | F16H 3/66 |
| 9,810,290 B2 * | 11/2017 | Hwang | ..................... | F16H 3/66 |
| 9,822,847 B2 * | 11/2017 | Lee | ............................ | F16H 3/66 |
| 9,822,848 B2 * | 11/2017 | Kwon | ....................... | F16H 3/66 |
| 9,845,845 B2 * | 12/2017 | Ji | ............................... | F16H 3/66 |
| 9,850,985 B2 * | 12/2017 | Cho | .......................... | F16H 3/66 |
| 9,897,169 B2 * | 2/2018 | Kook | ........................ | F16H 3/66 |
| 9,897,174 B2 * | 2/2018 | Hwang | ..................... | F16H 3/66 |

(Continued)

*Primary Examiner* — Dirk Wright
(74) *Attorney, Agent, or Firm* — Brinks Gilson & Lione

(57) ABSTRACT

A planetary gear train of an automatic transmission for a vehicle provides at least ten forward speeds and one reverse speed by combination of: first to fourth planetary gear sets respectively having first to third rotational elements, fourth to sixth rotational elements, seventh to ninth rotational elements, or tenth to twelfth rotational elements; first to ninth shafts; and multiple control elements including four clutches and three brakes. In particular, each of the tenth, eleventh, twelfth rotational elements is fixedly connected with a different shaft selected from the first, sixth, seventh and ninth shafts, and one clutch is fixedly connected with the ninth shaft.

18 Claims, 4 Drawing Sheets

(56) References Cited

U.S. PATENT DOCUMENTS

| | | | | |
|---|---|---|---|---|
| 10,107,365 B2* | 10/2018 | Hwang | ................... | F16H 3/66 |
| 2017/0159762 A1* | 6/2017 | Kook | ..................... | F16H 3/66 |
| 2017/0159766 A1* | 6/2017 | Hwang | ................... | F16H 3/66 |
| 2017/0167574 A1* | 6/2017 | Kook | ..................... | F16H 3/66 |
| 2017/0284513 A1* | 10/2017 | Hwang | ................... | F16H 3/66 |
| 2018/0298989 A1* | 10/2018 | Kook | ..................... | F16H 3/62 |
| 2018/0298992 A1* | 10/2018 | Kook | ..................... | F16H 3/66 |

* cited by examiner

FIG. 2

| Shift-stage | Control element | | | | | | | Gear ratio |
|---|---|---|---|---|---|---|---|---|
| | C1 | C2 | C3 | C4 | B1 | B2 | B3 | |
| D1 | | | ● | ● | | | ● | 4.200 |
| D2 | | ● | ● | | | | ● | 2.800 |
| D3 | | ● | | ● | | | ● | 2.100 |
| D4 | ● | ● | | | | | ● | 1.720 |
| D5 | ● | ● | | ● | | | | 1.286 |
| D6 | ● | ● | ● | | | | | 1.000 |
| D7 | ● | | ● | ● | | | | 0.818 |
| D8 | ● | | ● | | | ● | | 0.692 |
| D9 | ● | | ● | | ● | | | 0.600 |
| D10 | ● | | | ● | ● | | | 0.474 |
| REV | | | | ● | ● | | ● | -4.200 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0052118, filed on Apr. 24, 2017, which is incorporated herein by reference in its entirety.

FIELD

The present disclosure relates to a planetary gear train of an automatic transmission for a vehicle to improve power delivery performance and fuel consumption.

BACKGROUND

The statements in this section merely provide background information related to the present disclosure and may not constitute prior art.

In automatic transmission field, technologies for achieving more shift stages to improve fuel consumption and driving efficiency have been developed.

In this sense, research on an engine has been undertaken to achieve weight reduction and to enhance fuel consumption by so-called downsizing, and research on an automatic transmission has been simultaneously performed to provide better drivability and fuel consumption by achieving more shift stages.

In order to achieve more shift stages for an automatic transmission, the number of parts, particularly the number of planetary gear sets is typically increased. This negatively affects installability, production cost, weight, and power flow efficiency.

Therefore, enhancing fuel efficiency of an automatic transmission with reduced parts becomes an important factor.

In this respect, an eight-speed automatic transmission having a planetary gear train has been recently introduced.

However, we have discovered that the total length of the eight speed automatic transmissions is lengthy due to arrangement of multiple planetary gear sets, therefor undermining installability of the transmission.

SUMMARY

The present disclosure provides a planetary gear train of an automatic transmission for a vehicle having advantages of obtaining shift-stages of the forward ten speeds and one reverse speed by reduced number of parts, improving power delivery performance and fuel consumption by multi-stages of an automatic transmission, and improving driving stability of a vehicle by utilizing a low rotation speed of an engine.

In one exemplary form of the present disclosure, a planetary gear train includes: an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft fixedly connected with the first rotational element and the input shaft; a second shaft fixedly connected with the second rotational element and selectively connected with the first shaft; a third shaft fixedly connected with the third rotational element and the fifth rotational element; a fourth shaft fixedly connected with the fourth rotational element and fixed to a transmission housing; a fifth shaft fixedly connected with the sixth rotational element; a sixth shaft fixedly connected with the seventh rotational element and selectively connected with the second shaft and fifth shaft respectively; a seventh shaft fixedly connected with the eighth rotational element and the output shaft; and an eighth shaft fixedly connected with the ninth rotational element. In particular, each of the tenth, eleventh, twelfth rotational elements is fixedly connected with a different shaft selected from the first shaft, the sixth shaft, the seventh shaft and a ninth shaft.

Further, the second, third, and eighth shafts may be selectively connected with the transmission housing respectively.

Further, the tenth rotational element may be fixedly connected with the sixth shaft, the eleventh rotational element may be fixedly connected with the first shaft, and the twelfth rotational element may be fixedly connected with the ninth shaft and selectively connected with the seventh shaft.

The planetary gear train may further include: a first clutch selectively connecting the seventh shaft and the ninth shaft; a second clutch selectively connecting the first shaft and the second shaft; a third clutch selectively connecting the second shaft and the sixth shaft; a fourth clutch selectively connecting the fifth shaft and the sixth shaft; a first brake selectively connecting the second shaft and the transmission housing; a second brake selectively connecting the third shaft and the transmission housing; and a third brake selectively connecting the eighth shaft and the transmission housing.

In another form, the tenth rotational element may be fixedly connected with the sixth shaft, the eleventh rotational element may be fixedly connected with the ninth shaft and selectively connected with the first shaft, the twelfth rotational element may be fixedly connected with the seventh shaft.

In still another form, the planetary gear train may include a second clutch selectively connecting the first shaft and the second shaft; a third clutch selectively connecting the second shaft and the sixth shaft; a fourth clutch selectively connecting the fifth shaft and the sixth shaft; a first brake selectively connecting the second shaft and the transmission housing; a second brake selectively connecting the third shaft and the transmission housing; and a third brake selectively connecting the eighth shaft and the transmission housing.

In other form, the tenth rotational element may be fixedly connected with the ninth shaft and selectively connected with the sixth shaft, the eleventh rotational element may be fixedly connected with the first shaft, and the twelfth rotational element may be fixedly connected with the seventh shaft.

In other form, the planetary gear train may include: a second clutch selectively connecting the first shaft and the second shaft; a third clutch selectively connecting the second shaft and the sixth shaft; a fourth clutch selectively connecting the fifth shaft and the sixth shaft; a first brake selectively connecting the second shaft and the transmission housing; a second brake selectively connecting the third shaft and the transmission housing; and a third brake selectively connecting the eighth shaft and the transmission housing.

Further, the first, second, and third rotational elements of the first planetary gear set may be respectively a first sun gear, a first planet carrier, and a first ring gear of the first planetary gear set, the fourth, fifth, and sixth rotational elements of the second planetary gear set may be respectively a second sun gear, a second planet carrier, and a second ring gear of the second planetary gear set, the seventh, eighth, and ninth rotational elements of the third planetary gear set may be respectively a third sun gear, a third planet carrier, and a third ring gear of the third planetary gear set, and the tenth, eleventh, and twelfth rotational elements of the fourth planetary gear set may be respectively a fourth sun gear, a fourth planet carrier, and a fourth ring gear of the fourth planetary gear set.

With the arrangement discussed above, a planetary gear train of an automatic transmission provides shift-stages of forward ten speeds and one reverse speed by combination of four planetary gear sets of simple planetary gear sets and seven control elements.

Further, a planetary gear train according to an exemplary form of the present disclosure may realize shift stages appropriate for rotation speed of an engine due to multi-stages of an automatic transmission and improve driving stability of a vehicle by utilizing a low rotation speed of an engine.

Further, a planetary gear train according to an exemplary form of the present disclosure increases engine driving efficiency by multi-stages of an automatic transmission, and may improve power delivery performance and fuel consumption.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective control elements at respective shift stages in a planetary gear train according to an exemplary form of the present disclosure;

Figure 1:
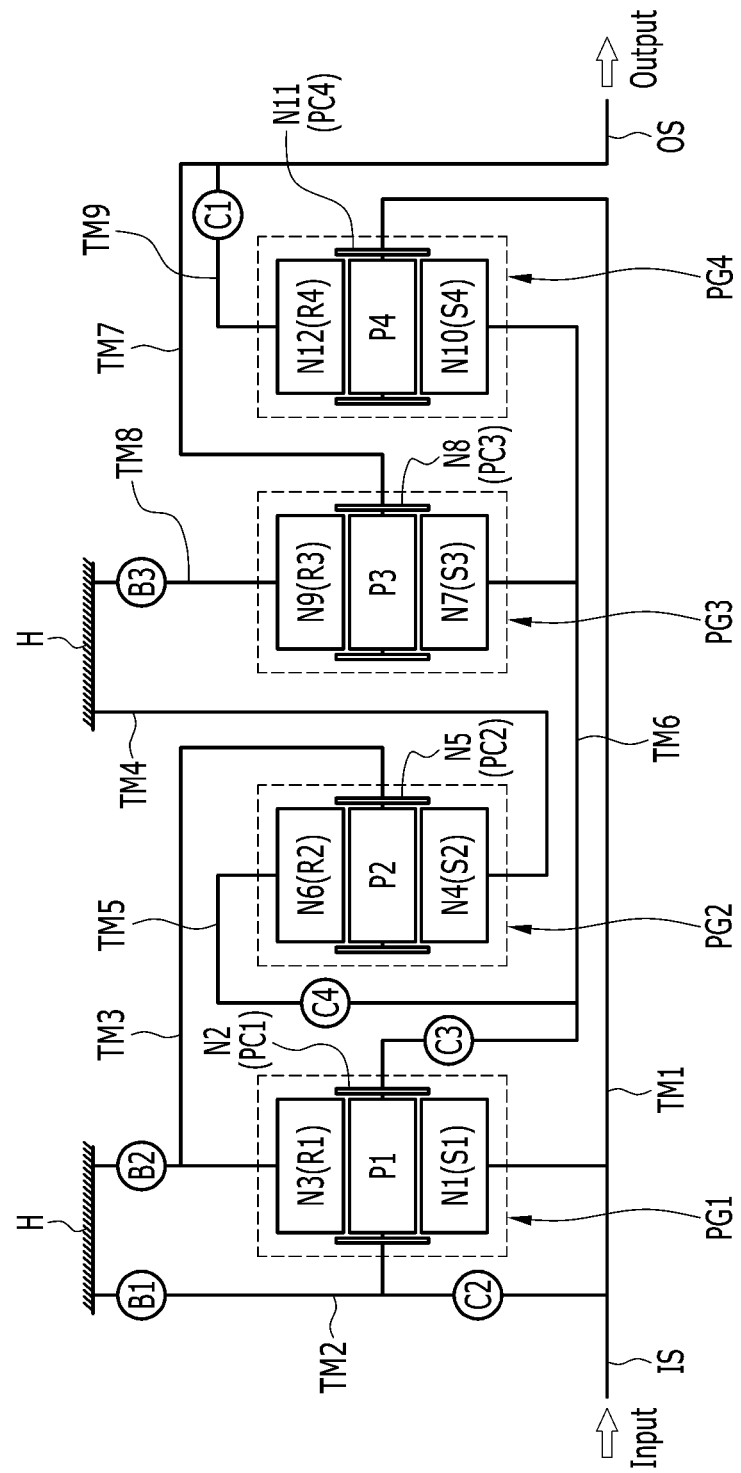
FIG. 1 is a schematic diagram of a planetary gear train according to a first exemplary form of the present disclosure.

The drawings described herein are for illustration purposes only and are not intended to limit the scope of the present disclosure in any way.

DETAILED DESCRIPTION

Hereinafter, an exemplary form of the present disclosure will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

FIG. 1 is a schematic diagram of a planetary gear train according to a first exemplary form of the present disclosure.

Referring to FIG. 1, a planetary gear train includes: first, second, third, and fourth planetary gear sets PG1, PG2, PG3, and PG4 arranged on a same axis, an input shaft IS, an output shaft OS, nine shafts TM1 to TM9 connected with rotational elements of the first, second, third, and fourth planetary gear sets PG1, PG2, PG3, and PG4, four clutches C1 to C4 and three brakes B1, B2 and B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus which is not illustrated.

The first planetary gear set PG1 is a single pinion planetary gear set, and includes a first sun gear S1, a first planet carrier PC1 that supports a plurality of first pinion gear P1 externally engaged with the first sun gear S1 so that the first pinion gear P1 may rotate and revolve, and a first ring gear R1 internally engaged and torque-connected with a plurality of the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a plurality of second pinion gear P2 externally engaged with the second sun gear S2 so that the second pinion gear P2 may rotate and revolute, and a second ring gear R2 internally engaged and torque-connected with a plurality of the second pinion P2. The second sun gear S2 acts as a fourth rotational element N4, the second planet carrier PC2 acts as a fifth rotational element N5, and the second ring gear R2 acts as a sixth rotational element N6

The third planetary gear set PG3 is a single pinion planetary gear set, and includes a third sun gear S3, a third planet carrier PC3 that supports a plurality of a third pinion gear P3 externally engaged with the third sun gear S3 so that the third pinion gear P3 may rotate and revolute, and a third ring gear R3 internally engaged and torque-connected with a plurality of the third pinion P3. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a plurality of a fourth pinion gear P4 externally engaged with the fourth sun gear S4 so that the fourth pinion gear P4 may rotate and revolve, and a fourth ring gear R4 internally engaged and torque-connected with a plurality of the fourth pinion P4. The fourth sun gear S4 acts as a tenth rotational element N10, the tenth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 and the eleventh rotational element N11 are directly connected with each other, the third rotational element N3 and the fifth rotational element N5 are directly connected with each other, and the seventh rotational element N7 and the tenth rotational element N10 are directly connected with each other by nine shafts TM1 to TM9.

The nine shafts TM1 to TM9 are arranged as follows.

Each of the nine shafts TM1 to TM9 may be a rotational member that delivers torque and rotates with rotational element which directly or selectively interconnects a plurality of the rotational elements of the rotational elements of the planetary gear sets PG1, PG2, PG3, and PG4, and the nine shafts TM1 to TM9 may be a rotational member selectively connecting the rotational element with the transmission housing H, or be a fixed member directly connecting and fixing the rotational element with the transmission housing H.

The first shaft TM1 fixedly connects the first rotational element N1 (the first sun gear S1) and the eleventh rotational element N11 (the fourth planetary carrier PC4) and also the first shaft TM1 is fixedly connected with the input shaft IS, thereby always acting as an input element.

The second shaft TM2 is fixedly connected with the second rotational element N2 (the first planet carrier PC1), selectively connected with the first shaft TM1, and selectively connected with the transmission housing H, thereby acting as a selective fixed element.

The third shaft TM3 is fixedly connected with the third rotational element N3 (the first ring gear R1) and the fifth rotational element N5 (the second planetary carrier PC2) and selectively connected with the transmission housing H, thereby acting as a selective fixed element.

The fourth shaft TM4 is fixedly connected with the fourth rotational element N4 (the second sun gear S2), and directly connected with the transmission housing H, thereby always acting as a fixed element.

The fifth shaft TM5 is fixedly connected with the sixth rotational element N6 (the second ring gear R2).

The sixth shaft TM6 is fixedly connected with the seventh rotational element N7 (the third sun gear S3) and the tenth rotational element N10 (the fourth sun gear S4) and selectively connected with the second shaft TM2 and the fifth shaft TM5.

The seventh shaft TM7 is fixedly connected with the eighth rotational element N8 (the third planetary carrier PC3) and the output shaft OS, thereby always acting as an output element.

The eighth shaft TM8 is fixedly connected with the ninth rotational element N9 (the third ring gear R3), and selectively connected with the transmission housing H, thereby acting as a selective fixed element.

The ninth shaft TM9 is fixedly connected with the twelfth rotational element N12 (the fourth ring gear R4), and selectively connected with the seventh shaft TM7.

The nine shafts TM1 to TM9, the input shaft IS, and the output shaft OS may be selectively interconnected with one another by control elements of four clutches C1, C2, C3 and C4.

The shafts TM1 to TM9 may be selectively connected with the transmission housing H, by control elements of three brakes B1, B2 and B3.

The four clutches C1 to C4 and the three brakes B1, B2 and B3 are arranged as follows.

The first clutch C1 is arranged between the seventh shaft TM7 and the ninth shaft TM9, so as to selectively connecting the seventh shaft TM7 and the ninth shaft TM9 for power delivery.

The second clutch C2 is arranged between the first shaft TM1 and the second shaft TM2, so as to selectively connecting the first shaft TM1 and the second shaft TM2 for power delivery.

The third clutch C3 is arranged between the second shaft TM2 and the sixth shaft TM6, so as to selectively connecting the second shaft TM2 and the sixth shaft TM6 for power delivery.

The fourth clutch C4 is arranged between the fifth shaft TM5 and the sixth shaft TM6, so as to selectively connecting the fifth shaft TM5 and the sixth shaft TM6 for power delivery.

The first brake B1 is arranged between the second shaft TM2 and the transmission housing H, such that the second shaft TM2 may be selectively connected with the transmission housing H and act as a fixed element.

The second brake B2 is arranged between the third shaft TM3 and the transmission housing H, such that the third shaft TM3 may be selectively connected with the transmission housing H and act as a fixed element.

The third brake B3 is arranged between the eighth shaft TM8 and the transmission housing H, such that the eighth shaft TM8 may be selectively connected with the transmission housing H and act as a fixed element.

The control elements of the first, second, third, and fourth clutches C1, C2, C3, and C4 and the first, second, third brakes B1, B2 and B3 may be realized as hydraulic pressure friction control elements that are frictionally engaged by hydraulic pressure supplied from a hydraulic pressure control devices. The control elements are primarily used as a wet multi-plate hydraulic pressure friction control element, but as control elements which may operate according to electric signal supplied from an electronic control devices such as a dog clutch, an electro-magnetic clutch, a magna clutch etc.

FIG. 2 is an operational chart for respective control elements at respective shift stages in a planetary gear train according to an exemplary form of the present disclosure.

Referring to FIG. 2, a planetary gear train realizes forward ten speeds and one reverse speed by operating three control elements among the first, second, third, and fourth clutches C1, C2, C3, and C4 and the first, second, and third brakes B1, B2 and B3 at respective shift-stages.

In the forward first speed shift-stage D1, the third and fourth clutches C3 and C4 and the third brake B3 are simultaneously operated.

As a result, the second shaft TM2 and the sixth shaft TM6 are interconnected with each other by the operation of the third clutch C3, and the fifth shaft TM5 and the sixth shaft TM6 are interconnected with each other by the operation of the fourth clutch C4. In this state, torque of the Input shaft IS is input to the first shaft TM1.

Further, the eighth shaft TM8 acts as a fixed element by the operation of the third brake B3, thereby realizing the forward first speed and outputting a shifted torque through the output shaft OS connected with the seventh shaft TM7.

In the forward second speed shift-stage D2, the second and third clutches C2 and C3 and the third brake B3 are simultaneously operated.

As a result, the first shaft TM1 and the second shaft TM2 are interconnected with each other by the operation of the second clutch C2, and the second shaft TM2 and the sixth shaft TM6 are interconnected with each other by the operation of the third clutch C3. In this state, torque of the Input shaft IS is input to the first shaft TM1.

Further, the eighth shaft TM8 acts as a fixed element by the operation of the third brake B3, thereby realizing the forward second speed and outputting a shifted torque through the output shaft OS connected with the seventh shaft TM7.

In the forward third speed shift-stage D3, the second and fourth clutches C2 and C4 and the third brake B3 are simultaneously operated.

As a result, the first shaft TM1 and the second shaft TM2 are interconnected with each other by the operation of the second clutch C2, and the fifth shaft TM5 and the sixth shaft TM6 are interconnected with each other by the operation of the fourth clutch C4. In this state, torque of the Input shaft IS is input to the first shaft TM1.

Further, the eighth shaft TM8 acts as a fixed element by the operation of the third brake B3, thereby realizing the forward third speed and outputting a shifted torque through the output shaft OS connected with the seventh shaft TM7.

In the forward fourth speed shift-stage D4, the first and second clutches C1 and C2 and the third brake B3 are simultaneously operated.

As a result, the seventh shaft TM7 and the ninth shaft TM9 are interconnected with each other by the operation of the first clutch C1, and the first shaft TM1 and the second shaft TM2 are interconnected with each other by the operation of the second clutch C2. In this state, torque of the Input shaft IS is input to the first shaft TM1.

Further, the eighth shaft TM8 acts as a fixed element by the operation of the third brake B3, thereby realizing the forward fourth speed and outputting a shifted torque through the output shaft OS connected with the seventh shaft TM7.

In the forward fifth speed shift-stage D5, the first, second, and fourth clutches C1, C2, and C4 are simultaneously operated.

As a result, the seventh shaft TM7 and the ninth shaft TM9 are interconnected with each other by the operation of the first clutch C1, the first shaft TM1 and the second shaft TM2 are interconnected with each other by the operation of the second clutch C2, and the fifth shaft TM5 and the sixth shaft TM6 are interconnected with each other by the operation of the fourth clutch C4. In this state, torque of the Input shaft IS is input to the first shaft TM1.

Then, the forward fifth speed is realized and a shifted torque through the output shaft OS connected with the seventh shaft TM7 is output.

In the forward sixth speed shift-stage D6, the first, second, and third clutches C1, C2, and C3 are simultaneously operated.

As a result, the seventh shaft TM7 and the ninth shaft TM9 are interconnected with each other by the operation of the first clutch C1, the first shaft TM1 and the second shaft TM2 are interconnected with each other by the operation of the second clutch C2, and the second shaft TM2 and the sixth shaft TM6 are interconnected with each other by the operation of the third clutch C3. In this state, torque of the Input shaft IS is input to the first shaft TM1.

Then, the first, second, third, and fourth planetary gear sets PG1, PG2, PG3, and PG4 are integrally rotate, and a shifted torque of the input shaft IS is transmitted to a forward sixth speed to be output through the output shaft OS connected with the seventh shaft TM7.

In the forward sixth speed shift-stage D7, the first, third, and fourth clutches C1, C3, and C4 are simultaneously operated.

As a result, the seventh shaft TM7 and the ninth shaft TM9 are interconnected with each other by the operation of the first clutch C1, the second shaft TM2 and the sixth shaft TM6 are interconnected with each other by the operation of the third clutch C3, and the fifth shaft TM5 and the sixth shaft TM6 are interconnected with each other by the operation of the fourth clutch C4. In this state, torque of the Input shaft IS is input to the first shaft TM1.

Then, the forward seventh speed is realized and a shifted torque through the output shaft OS connected with the seventh shaft TM7 is output.

In the forward eighth speed shift-stage D8, the first and third clutches C1 and C3 and the second brake B2 are simultaneously operated.

As a result, the seventh shaft TM7 and the ninth shaft TM9 are interconnected with each other by the operation of the first clutch C1, and the second shaft TM2 and the sixth shaft TM6 are interconnected with each other by the operation of the third clutch C3. In this state, torque of the Input shaft IS is input to the first shaft TM1.

Further, the third shaft TM3 acts as a fixed element by the operation of the second brake B2, thereby realizing the forward eighth speed and outputting a shifted torque through the output shaft OS connected with the seventh shaft TM7.

In the forward ninth speed shift-stage D9, the first and third clutches C1 and C3 and the first brake B1 are simultaneously operated.

As a result, the seventh shaft TM7 and the ninth shaft TM9 are interconnected with each other by the operation of the first clutch C1, and the second shaft TM2 and the sixth shaft TM6 are interconnected with each other by the operation of the third clutch C3. In this state, torque of the Input shaft IS is input to the first shaft TM1.

Further, the second shaft TM2 acts as a fixed element by the operation of the first brake B1, thereby realizing the forward ninth speed and outputting a shifted torque through the output shaft OS connected with the seventh shaft TM7.

In the forward tenth speed shift-stage D10, the first and fourth clutches C1 and C4 and the first brake B1 are simultaneously operated.

As a result, the seventh shaft TM7 and the ninth shaft TM9 are interconnected with each other by the operation of the first clutch C1, and the fifth shaft TM5 and the sixth shaft TM6 are interconnected with each other by the operation of the fourth clutch C4. In this state, torque of the Input shaft IS is input to the first shaft TM1.

Further, the second shaft TM2 acts as a fixed element by the operation of the first brake B1, thereby realizing the forward tenth speed and outputting a shifted torque through the output shaft OS connected with the seventh shaft TM7.

In the reverse speed REV, the fourth clutch C4, the first and third brakes B1 and B3 are simultaneously operated.

As a result, the fifth shaft TM5 and the sixth shaft TM6 are interconnected by the operation of the fourth clutch C4. In this state, torque of the Input shaft IS is input to the first shaft TM1.

Further, the second shaft TM2 and the eighth shaft TM8 act as fixed elements by the operation of the first brake B1 and the third brake B3, thereby realizing the reverse speed and outputting a shifted torque through the output shaft OS connected with the seventh shaft TM7.

Figure 3:
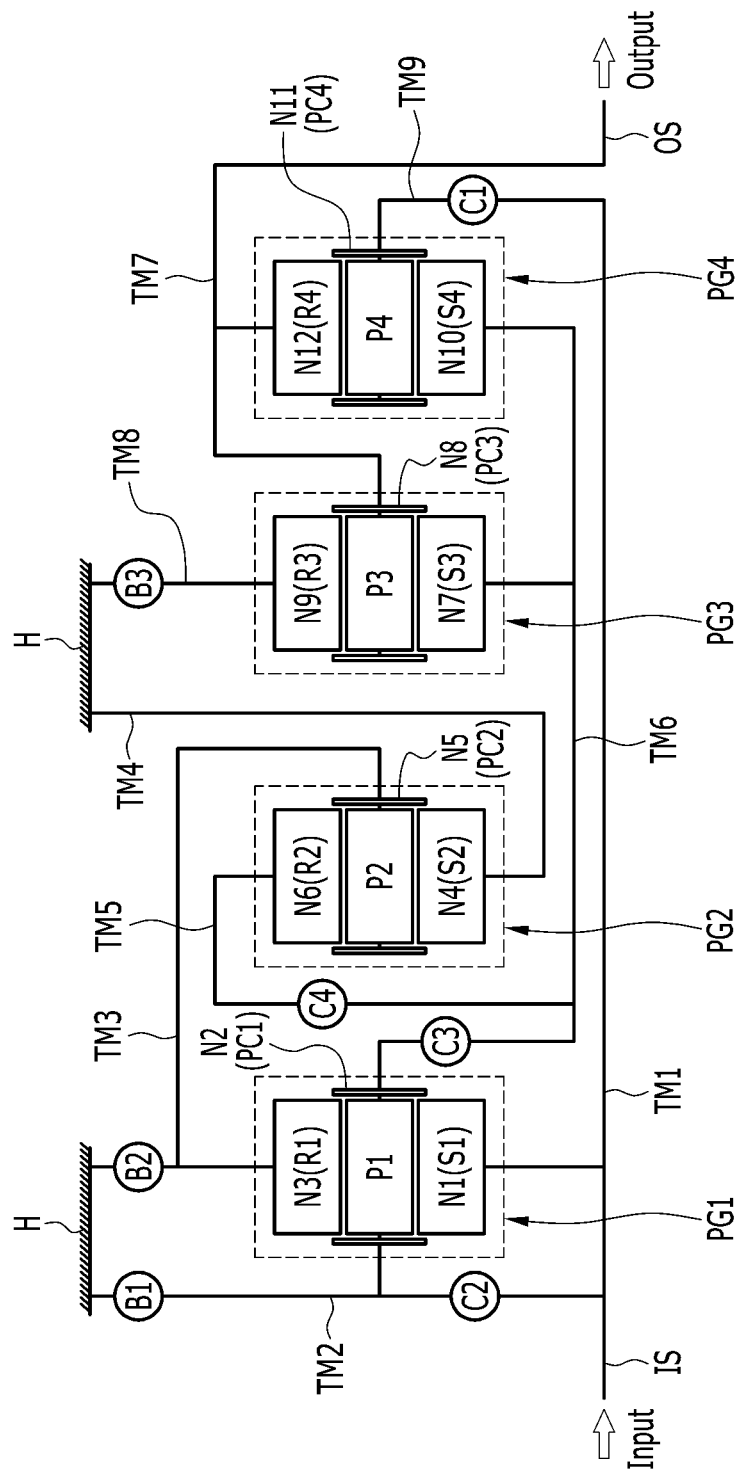
FIG. 3 is a schematic diagram of a planetary gear train according to a second exemplary form of the present disclosure.

FIG. 3 is a schematic diagram of a planetary gear train according to a second exemplary form of the present disclosure.

Referring to FIG. 1 and FIG. 3, in a planetary gear train according to a first exemplary form of the present disclosure, the first clutch C1 selectively connect the eighth rotational element N8 (the third planetary carrier PC3) with the twelfth rotational element N12 (the fourth ring gear R4), whereas in a planetary gear train according to a second exemplary form of the present disclosure, the first clutch C1 selectively connect the first rotational element N1 (the first sun gear S1) with the eleventh rotational element N11 (the fourth planetary carrier PC4).

Accordingly, in a planetary gear train according to a first exemplary form of the present disclosure, the first shaft TM1 fixedly connects the first rotational element N1 (the first sun gear S1) and the eleventh rotational element N11 (the fourth planetary carrier PC4), the seventh shaft TM7 is fixedly connected with the eighth rotational element N8 (the third planetary carrier PC3), and the ninth shaft TM9 is fixedly connected with the twelfth rotational element N12 (the fourth ring gear R4), whereas in a planetary gear train according to a second exemplary form of the present disclosure, the first shaft TM1 is fixedly connected with the first rotational element N1 (the first sun gear S1), the seventh shaft TM7 is fixedly connected with the eighth rotational element N8 (the third planetary carrier PC3) and the twelfth rotational element N12 (the fourth ring gear R4), and the ninth shaft TM9 is fixedly connected with the eleventh rotational element N11 (the fourth planetary carrier PC4).

This second exemplary form is different from the first exemplary form in that the arrangement of the first clutch C1 fixedly connected with the ninth shaft TM9 is different. However, connecting relations of the three clutches C2, C3 and C4 and three brakes B1, B2 and B3 are same, and operation and effect of the planetary gear train is same.

Figure 4:
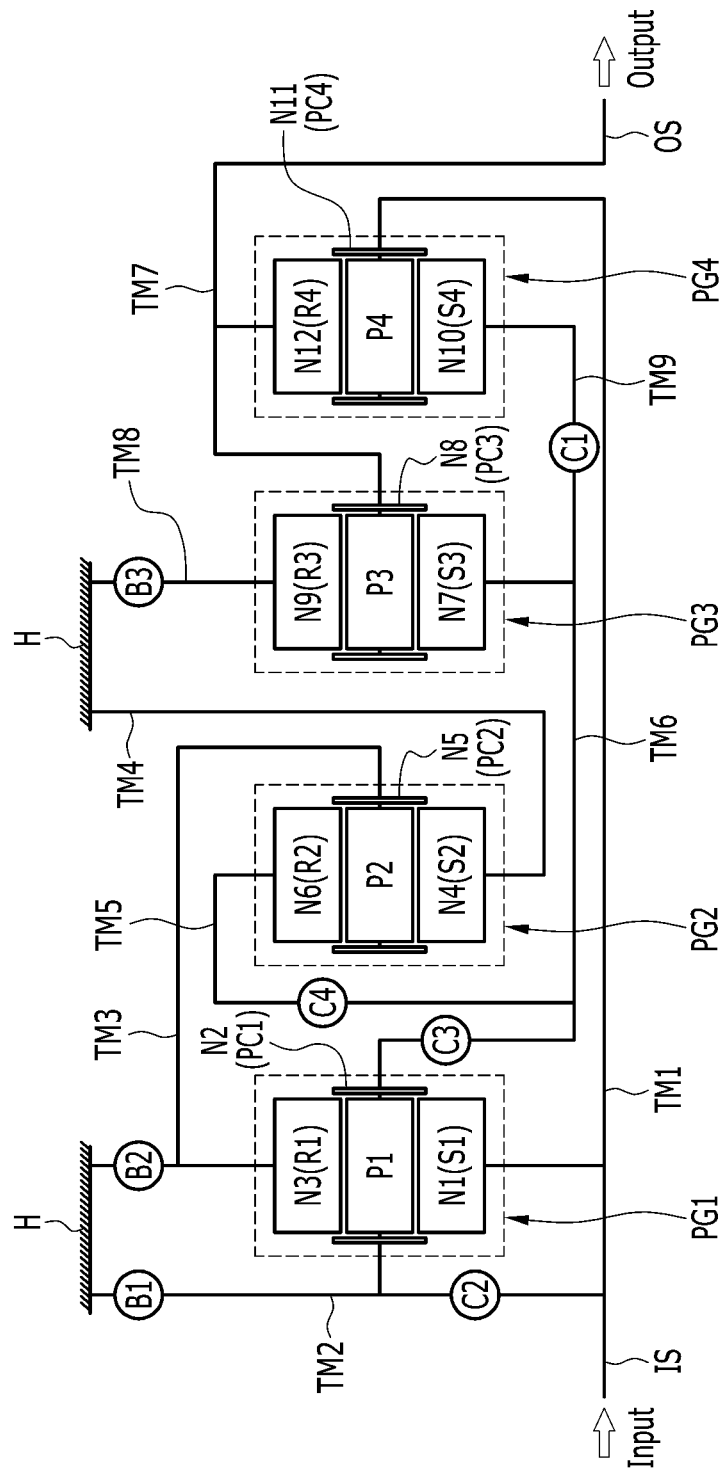
FIG. 4 is a schematic diagram of a planetary gear train according to a third exemplary form of the present disclosure.

FIG. 4 is a schematic diagram of a planetary gear train according to a third exemplary form of the present disclosure.

Referring to FIG. 1 and referring to FIG. 4, in a planetary gear train according to a first exemplary form of the present disclosure, the first clutch C1 selectively connects the eighth rotational element N8 (the third planetary carrier PC3) with the twelfth rotational element N12 (the fourth ring gear R4), whereas in a planetary gear train according to a third exemplary form of the present disclosure, the first clutch C1 selectively connects the seventh rotational element N7 (the third sun gear S3) with the tenth rotational element N10 (the fourth sun gear S4).

Accordingly, in a planetary gear train according to a first exemplary form of the present disclosure, the first shaft TM1 fixedly connects the first rotational element N1 (the first sun gear S1) and the eleventh rotational element N11 (the fourth planetary carrier PC4), the seventh shaft TM7 is fixedly connected with the eighth rotational element N8 (the third planetary carrier PC3), and the ninth shaft TM9 is fixedly connected with the twelfth rotational element N12 (the fourth ring gear R4), whereas in a planetary gear train according to a third exemplary form of the present disclosure, the sixth shaft TM6 is fixedly connected with the seventh rotational element N7 (the third sun gear S3), the seventh shaft TM7 is fixedly connected with the eighth rotational element N8 (the third planetary carrier PC3) and the twelfth rotational element N12 (the fourth ring gear R4), and the ninth shaft TM9 is fixedly connected with the tenth rotational element N10 (the fourth sun gear S4).

This third exemplary form is different from the first exemplary form in that connection relationships between the nine shafts TM1 to TM9 and the first clutch C1 are different, however, connecting relations with the three clutches C2, C3 and C4 and three brakes B1, B2 and B3 are same, and operation and effect of the planetary gear train is same.

As described above, a planetary gear train according to an exemplary form of the present disclosure may realize forward ten speeds and a reverse one speed formed by operating four planetary gear sets PG1, PG2, PG3, and PG4 by controlling the four clutches C1, C2, C3, and C4 and the three brakes B1, B2 and B3.

In addition, a planetary gear train according to an exemplary form of the present disclosure may realize shift stages appropriate for rotation speed of an engine due to multi-stages of an automatic transmission and improve driving stability of a vehicle by utilizing a low rotation speed of an engine.

In addition, a planetary gear train according to an exemplary form of the present disclosure may increase engine driving efficiency by multi-stages of an automatic transmission, and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2, B3 . . . first and second brakes
C1, C2, C3, C4 . . . first, second, third, and fourth clutches
PG1, PG2, PG3, PG4 . . . first, second, third, and fourth planetary gear sets
S1, S2, S3, S4 . . . first, second, third, and fourth sun gears
PC1, PC2, PC3, PC4 . . . first, second, third, and fourth planet carriers
R1, R2, R3, R4 . . . first, second, third, and fourth ring gears
IS . . . input shaft
OS . . . output shaft
TM1, TM2, TM3, TM4, TM5, TM6, TM7, TM8, TM9 . . . first, second, third, fourth, fifth, sixth, seventh, eighth, and ninth shafts

What is claimed is:

1. A planetary gear train of an automatic transmission for a vehicle, the planetary gear train comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft fixedly connected with the first rotational element and the input shaft;
   a second shaft fixedly connected with the second rotational element and selectively connected with the first shaft;

a third shaft fixedly connected with the third rotational element and the fifth rotational element;
a fourth shaft fixedly connected with the fourth rotational element and fixed to a transmission housing;
a fifth shaft fixedly connected with the sixth rotational element;
a sixth shaft fixedly connected with the seventh rotational element, and the sixth shaft selectively connected with the second shaft and fifth shaft respectively;
a seventh shaft fixedly connected with the eighth rotational element and the output shaft;
an eighth shaft fixedly connected with the ninth rotational element; and
wherein each of the tenth, eleventh, twelfth rotational elements is fixedly connected with a different shaft selected from the first shaft, the sixth shaft, the seventh and a ninth shaft.

2. The planetary gear train of claim 1, wherein the second, third, and eighth shafts are selectively connected with the transmission housing respectively.

3. The planetary gear train of claim 2, wherein
the tenth rotational element is fixedly connected with the sixth shaft,
the eleventh rotational element is fixedly connected with the first shaft, and
the twelfth rotational element is fixedly connected with the ninth shaft and selectively connected with the seventh shaft.

4. The planetary gear train of claim 3, further comprising:
a first clutch selectively connecting the seventh shaft and the ninth shaft;
a second clutch selectively connecting the first shaft and the second shaft;
a third clutch selectively connecting the second shaft and the sixth shaft;
a fourth clutch selectively connecting the fifth shaft and the sixth shaft;
a first brake selectively connecting the second shaft and the transmission housing;
a second brake selectively connecting the third shaft and the transmission housing; and
a third brake selectively connecting the eighth shaft and the transmission housing.

5. The planetary gear train of claim 2, wherein
the tenth rotational element is fixedly connected with the sixth shaft,
the eleventh rotational element is fixedly connected with the ninth shaft and selectively connected with the first shaft, and
the twelfth rotational element is fixedly connected with the seventh shaft.

6. The planetary gear train of claim 5, further comprising:
a first clutch selectively connecting the first shaft and the ninth shaft;
a second clutch selectively connecting the first shaft and the second shaft;
a third clutch selectively connecting the second shaft and the sixth shaft;
a fourth clutch selectively connecting the fifth shaft and the sixth shaft;
a first brake selectively connecting the second shaft and the transmission housing;
a second brake selectively connecting the third shaft and the transmission housing; and
a third brake selectively connecting the eighth shaft and the transmission housing.

7. The planetary gear train of claim 1, wherein
the tenth rotational element is fixedly connected with the ninth shaft and selectively connected with the sixth shaft,
the eleventh rotational element is fixedly connected with the first shaft, and
the twelfth rotational element is fixedly connected with the seventh shaft.

8. The planetary gear train of claim 7, further comprising:
a first clutch selectively connecting the sixth shaft and the ninth shaft;
a second clutch selectively connecting the first shaft and the second shaft;
a third clutch selectively connecting the second shaft and the sixth shaft;
a fourth clutch selectively connecting the fifth shaft and the sixth shaft;
a first brake selectively connecting the second shaft and the transmission housing;
a second brake selectively connecting the third shaft and the transmission housing; and
a third brake selectively connecting the eighth shaft and the transmission housing.

9. The planetary gear train of claim 1, wherein
the first, second, and third rotational elements of the first planetary gear set are respectively a first sun gear, a first planet carrier, and a first ring gear of the first planetary gear set,
the fourth, fifth, and sixth rotational elements of the second planetary gear set are respectively a second sun gear, a second planet carrier, and a second ring gear of the second planetary gear set,
the seventh, eighth, and ninth rotational elements of the third planetary gear set are respectively a third sun gear, a third planet carrier, and a third ring gear of the third planetary gear set, and
the tenth, eleventh, and twelfth rotational elements of the fourth planetary gear set are respectively a fourth sun gear, a fourth planet carrier, and a fourth ring gear of the fourth planetary gear set.

10. A planetary gear train of an automatic transmission for a vehicle, the planetary gear train comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the first rotational element is fixedly connected with the input shaft,
the eighth rotational element is fixedly connected with the output shaft,
the second rotational element is selectively connected with the first and seventh rotational elements respectively,
the third rotational element is fixedly connected with the fifth rotational element,
the fourth rotational element is fixed to a transmission housing,
the sixth rotational element is selectively connected with the seventh rotational element, and
wherein the tenth, eleventh, twelfth rotational elements are connected with the seventh, first, and eighth rotational elements respectively, and one rotational element of the tenth, eleventh, and twelfth rotational elements is selectively connected with a corresponding rotational element selected from the first, seventh and eighth rotational elements by a first clutch.

11. The planetary gear train of claim 10, wherein
the second, third, and ninth rotational elements are selectively connected with the transmission housing respectively.

12. The planetary gear train of claim 11, wherein
the tenth rotational element is fixedly connected with the seventh rotational element,
the eleventh rotational element is fixedly connected with the first rotational element, and
the twelfth rotational element is selectively connected with the eighth rotational element.

13. The planetary gear train of claim 12, further comprising:
a second clutch selectively connecting the first rotational element and the second rotational element;
a third clutch selectively connecting the second rotational element and the seventh rotational element;
a fourth clutch selectively connecting the sixth rotational element and the seventh rotational element;
a first brake selectively connecting the second rotational element and the transmission housing;
a second brake selectively connecting the third rotational element and the transmission housing; and
a third brake selectively connecting the ninth rotational element and the transmission housing,
wherein the first clutch is configured to selectively connect the eighth rotational element to the twelfth rotational element.

14. The planetary gear train of claim 11, wherein
the tenth rotational element is fixedly connected with the seventh rotational element,
the eleventh rotational element is selectively connected with the first rotational element, and
the twelfth rotational element is fixedly connected with the eighth rotational element.

15. The planetary gear train of claim 14, further comprising:
a second clutch selectively connecting the first rotational element and the second rotational element;
a third clutch selectively connecting the second rotational element and the seventh rotational element;
a fourth clutch selectively connecting the sixth rotational element and the seventh rotational element;
a first brake selectively connecting the second rotational element and the transmission housing;
a second brake selectively connecting the third rotational element and the transmission housing; and
a third brake selectively connecting the ninth rotational element and the transmission housing,
wherein the first clutch is configured to selectively connect the first rotational element to the eleventh rotational element.

16. The planetary gear train of claim 11, wherein
the tenth rotational element is selectively connected with the seventh rotational element,
the eleventh rotational element is fixedly connected with the first rotational element, and
the twelfth rotational element is fixedly connected with the eighth rotational element.

17. The planetary gear train of claim 16, further comprising:
a second clutch selectively connecting the first rotational element and the second rotational element;
a third clutch selectively connecting the second rotational element and the seventh rotational element;
a fourth clutch selectively connecting the sixth rotational element and the seventh rotational element;
a first brake selectively connecting the second rotational element and the transmission housing;
a second brake selectively connecting the third rotational element and the transmission housing; and
a third brake selectively connecting the ninth rotational element and the transmission housing,
wherein the first clutch is configured to selectively connect the seventh rotational element to the tenth rotational element.

18. The planetary gear train of claim 10, wherein:
the first, second, and third rotational elements of the first planetary gear set are respectively a first sun gear, a first planet carrier, and a first ring gear of the first planetary gear set,
the fourth, fifth, and sixth rotational elements of the second planetary gear set are respectively a second sun gear, a second planet carrier, and a second ring gear of the second planetary gear set,
the seventh, eighth, and ninth rotational elements of the third planetary gear set are respectively a third sun gear, a third planet carrier, and a third ring gear of the third planetary gear set, and
the tenth, eleventh, and twelfth rotational elements of the fourth planetary gear set are respectively a fourth sun gear, a fourth planet carrier, and a fourth ring gear of the fourth planetary gear set.

* * * * *